(12) United States Patent
Arias

(10) Patent No.: US 6,651,469 B2
(45) Date of Patent: Nov. 25, 2003

(54) TRUCK SEAT RETAINER

(76) Inventor: Antonio M. Arias, P.O. Box 7878, Panama 9 (PA)

( * ) Notice: Subject to any disclaimer, the term of this patent is extended or adjusted under 35 U.S.C. 154(b) by 0 days.

(21) Appl. No.: 09/755,896

(22) Filed: Jan. 5, 2001

(65) Prior Publication Data

US 2002/0088259 A1 Jul. 11, 2002

(51) Int. Cl.$^7$ .......................... A47C 31/00; E05B 65/44
(52) U.S. Cl. .......................... 70/261; 296/64; 410/143; 410/145; 410/151
(58) Field of Search .......................... 70/94, 261, 258; 296/64; 410/143, 145, 151; 224/551, 403

(56) References Cited

U.S. PATENT DOCUMENTS

| | | | | |
|---|---|---|---|---|
| 745,108 A | * | 11/1903 | Kashian | |
| 1,087,540 A | * | 2/1914 | Kennedy | |
| 2,494,081 A | * | 1/1950 | Baghuis | |
| 2,647,791 A | * | 8/1953 | Barenyi | |
| 2,988,135 A | * | 6/1961 | Caminiti | |
| 3,188,133 A | * | 6/1965 | Tewksbury | |
| 3,797,005 A | * | 3/1974 | Schwarz | 70/94 X |
| 3,840,263 A | * | 10/1974 | Bowden | 296/64 X |
| 4,669,767 A | * | 6/1987 | Leto | 70/94 X |
| 4,679,840 A | * | 7/1987 | Fry et al. | 296/64 |
| 4,718,583 A | * | 1/1988 | Mullican | 224/42.42 R |
| 5,022,697 A | * | 6/1991 | Hettwer | 70/238 X |
| 5,078,443 A | * | 1/1992 | Austin | 296/64 X |
| 5,277,043 A | * | 1/1994 | Inashvili | 70/238 |
| 5,281,063 A | * | 1/1994 | Austin, III | 410/151 |
| 5,368,354 A | * | 11/1994 | Martin | 296/64 |
| 5,516,179 A | * | 5/1996 | Tidwell | 296/64 X |
| 5,644,937 A | * | 7/1997 | Farino | 70/261 |
| 5,779,118 A | * | 7/1998 | Douglass | 224/407 |
| 5,785,475 A | * | 7/1998 | Winstel et al. | 410/149 X |
| 5,927,107 A | * | 7/1999 | Mitchell | 70/94 X |
| 5,971,685 A | * | 10/1999 | Owens | 410/143 X |
| 5,997,228 A | * | 12/1999 | Potter | 410/151 X |

FOREIGN PATENT DOCUMENTS

| | | | | |
|---|---|---|---|---|
| FI | 27836 | * | 12/1955 | 296/64 |
| SU | 765048 | * | 9/1980 | 296/64 |

* cited by examiner

Primary Examiner—Lloyd A. Gall
(74) Attorney, Agent, or Firm—Oltman, Flynn & Kubler

(57) ABSTRACT

A seat retainer arrangement for use on the cargo compartment of a pickup truck or the like comprising a substantially rigid, longitudinally extensible and retractable arm member for engagement removably to respective joints on the bed liner sections covering two opposite side walls of the cargo compartment.

4 Claims, 4 Drawing Sheets

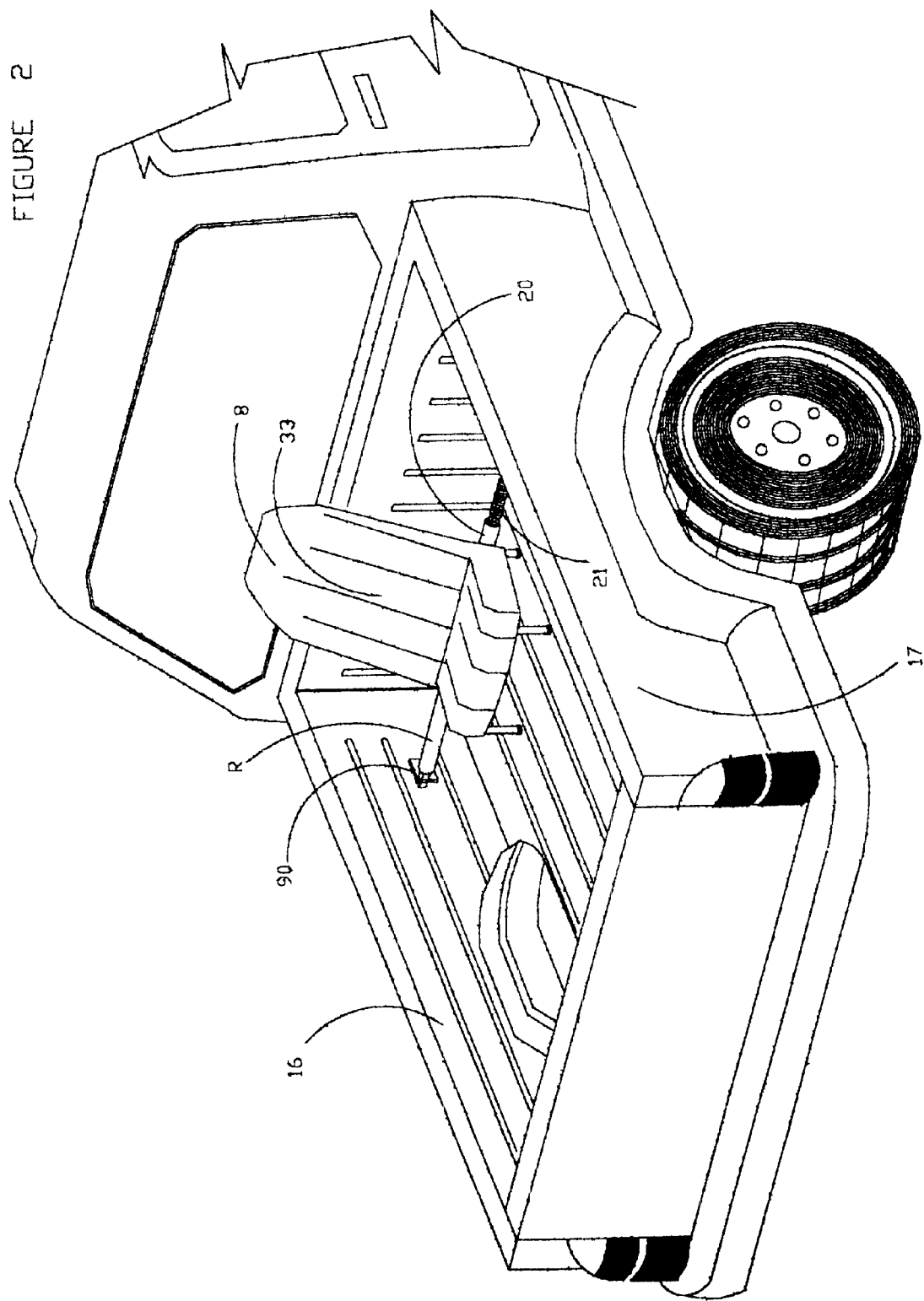

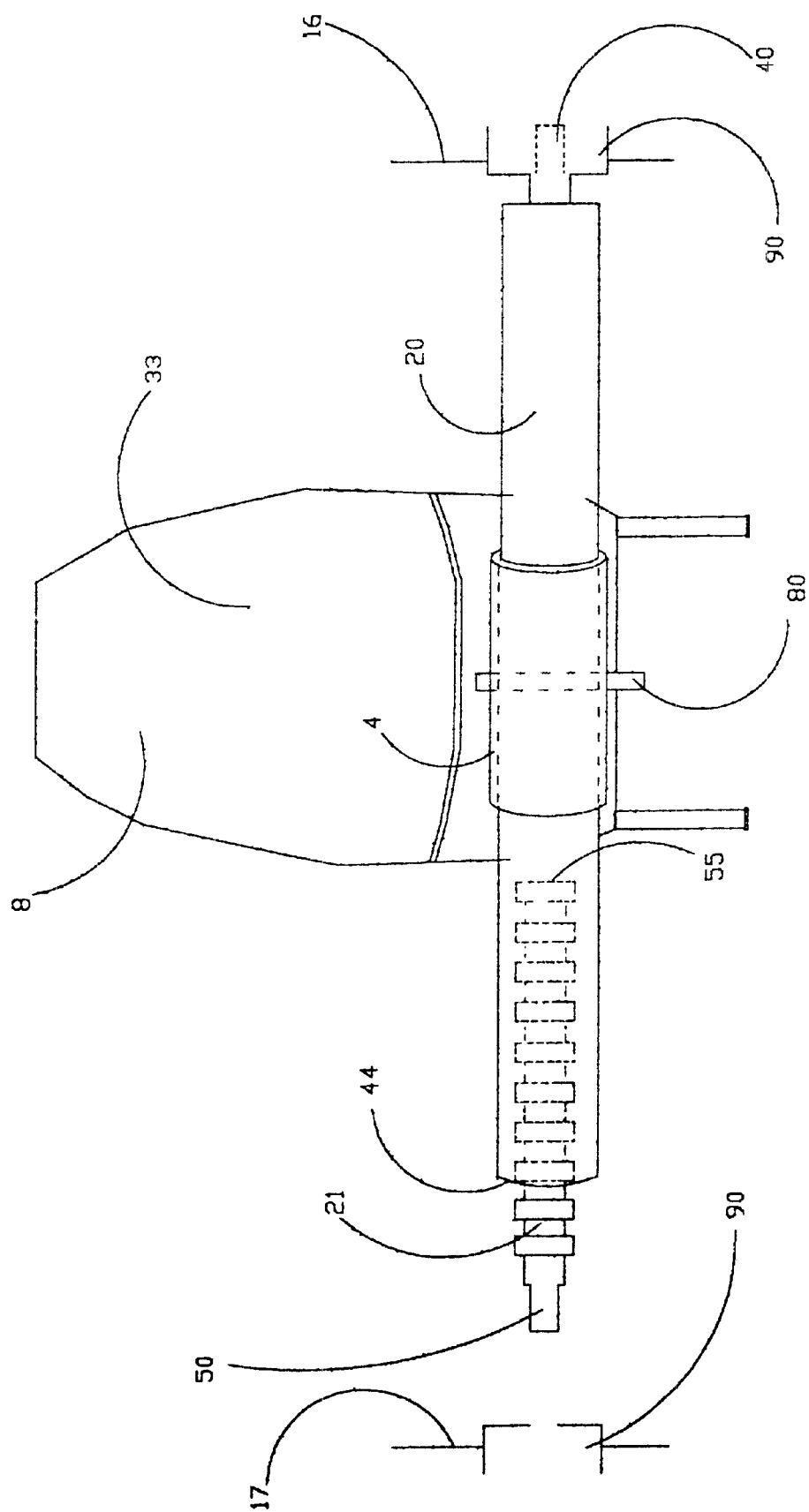

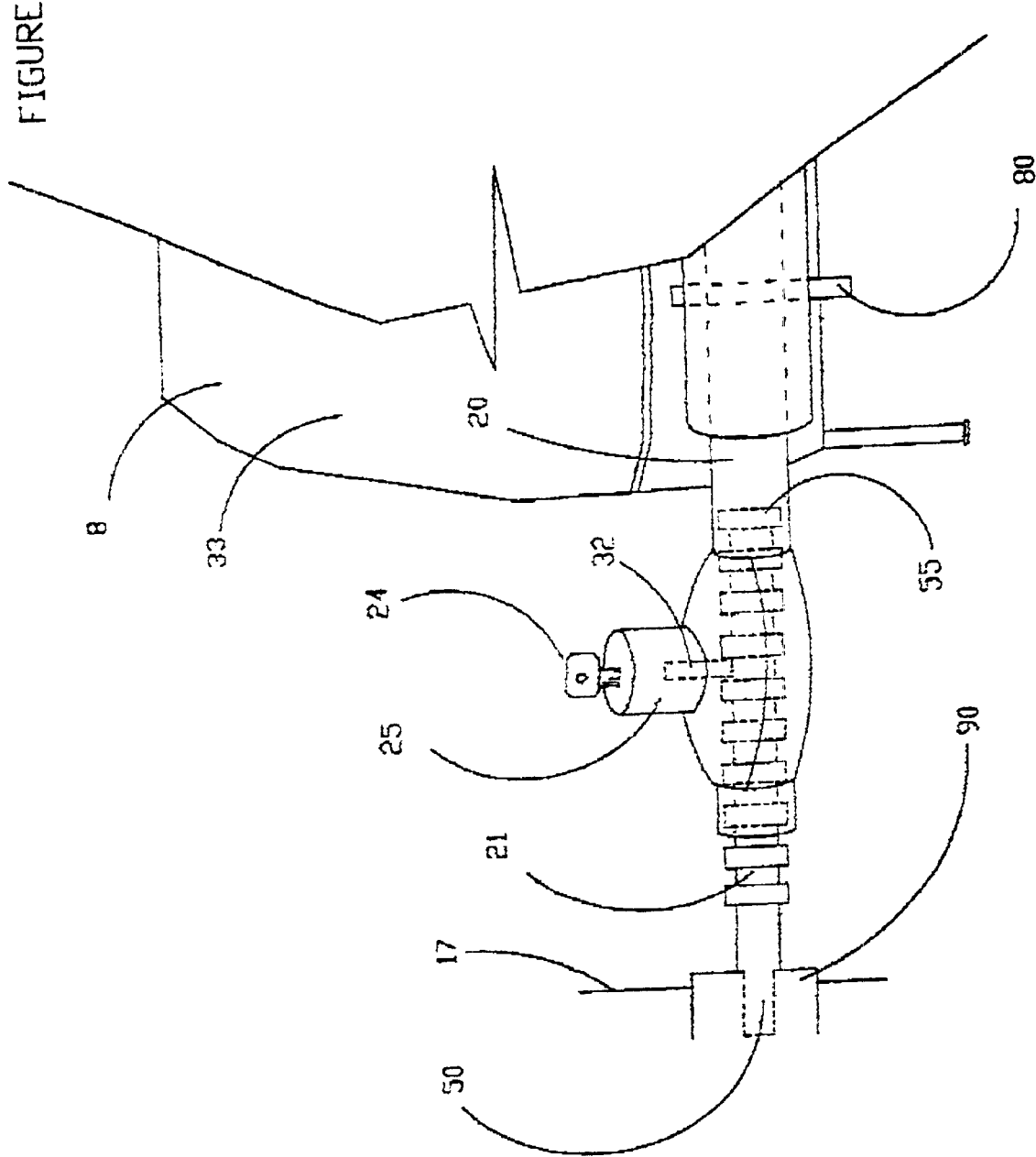

TRUCK SEAT RETAINER

BACKGROUND OF THE INVENTION

Field of the Invention

This invention relates to a novel arrangement for retaining seats in place in the cargo compartment of pickup trucks so that such trucks can carry comfortably seated passengers both in their cabs and cargo compartments. Truck cargo compartments are designed to transport cargo, not people. But by providing a fast and convenient means to retain seats in place in said compartments, that also allows truck users to detach the seats easily and instantly therefrom, said compartments would become more versatile and useful to truck users who would occassionally prefer to travel in an open or more natural environment, specially in off the road trips, to inspect a field, farm, forest, or park. Additionally, the seat retainer provides a key to releasably lock the seats to such open-topped cargo compartments and thus secure the seats against theft.

SUMMARY OF THE INVENTION

The principal object of the present invention is to provide an arrangement to conveniently retain seats in place in the cargo compartment of pickup trucks, that also allows truck users to detach the seats easily and instantly therefrom, so that such compartments can be readily used to transport either people or cargo. Additionally, the seat retainer provides a key to releasably lock the seats to such open-topped cargo compartments and thus secure the seats against theft.

BRIEF DESCRIPTION OF THE DRAWINGS

FIG. 2 shows a seat secured removably to a telescopic arm member which in turn is secured removably to said joints on the bed liner.

FIG. 3 shows that the telescopic arm member is attached removably to a securing loop on the rear of the seat. The securing loop is located under the backrest of the seat.

FIG. 4 shows a key inside a chamber on said telescopic arm member. The key serves to releasably lock the arm member to said joints, and thus to protect the seat against theft.

DETAILED DESCRIPTION OF THE PREFERRED EMBODIMENTS

Figure 1:
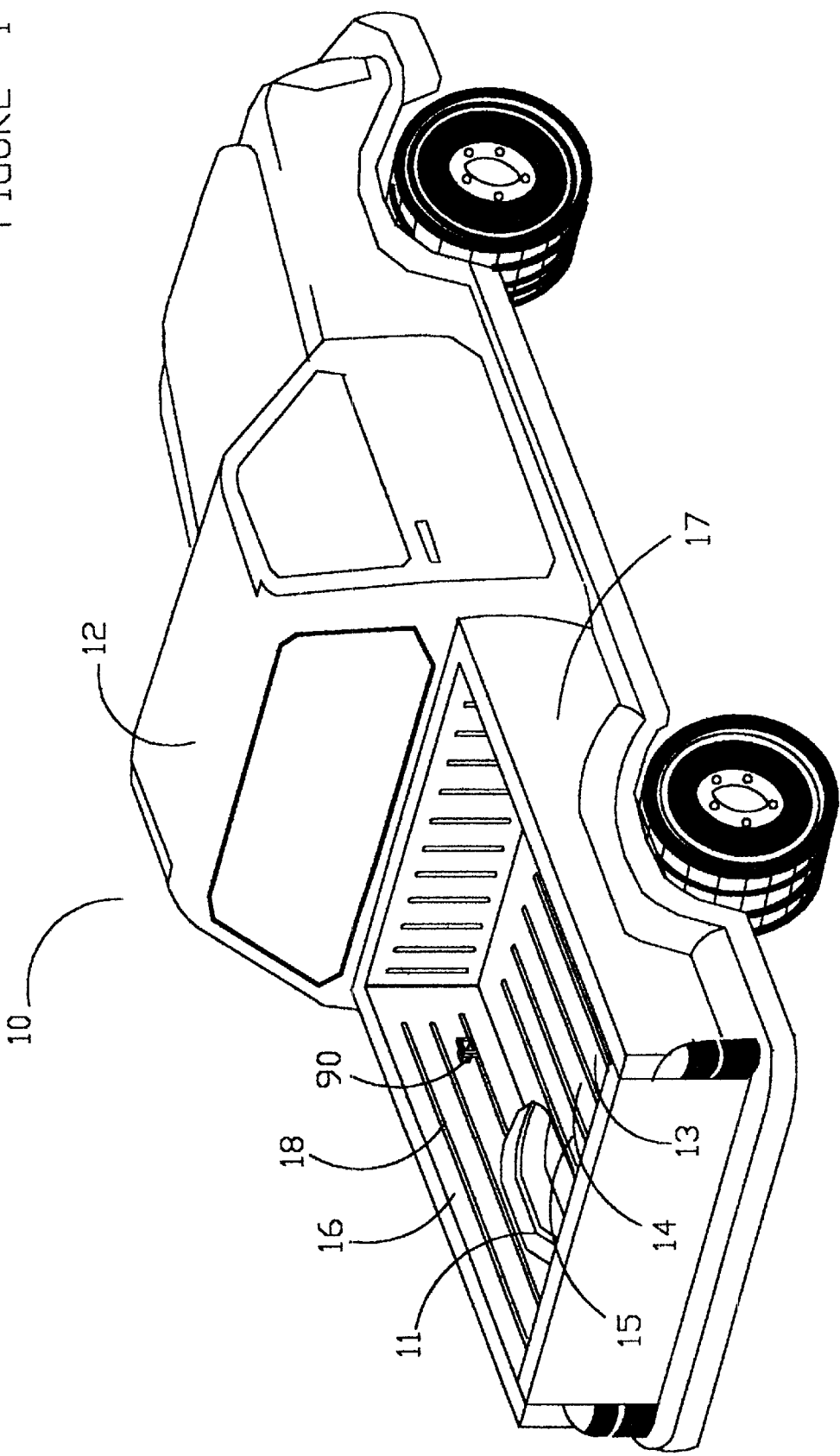
FIG. 1 is a top perspective view of a conventional pickup truck. The walls of the truck's cargo compartment are covered by a bed liner having shallow grooves. The bed liner protects the cargo compartment from scratches and rust and has a pair of rectangular recesses or joints to engage removably a telescopic arm member.

Before explaining the present invention in detail it is to be understood that the invention is not limited in its application to the particular arrangements shown and described herein since the invention is capable of other embodiments. Also, the terminology used herein is for the purpose of description and not of limitation.

Referring to FIG. 1, a conventional pickup truck 10 has an open-topped cargo compartment or area 11 behind the cab 12. A plastic or metal bed liner 13 on the inside of the walls of the truck cargo compartment presents a generally flat, horizontal bottom segment 14 formed with a plurality of laterally spaced, shallow grooves or recesses 15 extending longitudinally on the truck. The liner covers the inside faces of the opposite side walls 16 and 17 of the truck at the cargo compartment, and here it is also formed with longitudinally extending, horizontal, vertically spaced, narrow grooves or recesses 18.

In accordance with the present invention, the sides of the liner carry respective rectangular recesses or joints 90. Each joint 90 is rigidly affixed to a section of the bed liner covering a side wall of the truck's cargo compartment by suitable fasteners (e.g., screws) or adhesive. FIG. 1 shows joint 90 on one side only of the cargo compartment but it is to be understood that the opposite side of the cargo compartment has an identical joint 90 that is aligned, both lengthwise of the truck and vertically, with the joint appearing in FIG. 1.

Each joint 90 is spaced above the bottom of the cargo compartment to enable a corresponding seat retainer or arm member R to engage the seat a predetermined distance up from the bottom of the seat resting on the bottom 14 of the truck's cargo compartment. Joints 90 receive the laterally outward rectangular ends of the corresponding substantially rigid, longitudinally extensible and retractable seat retainer or arm member R on opposite sides of the particular seat then being carried by the truck.

The principal purpose of the bed liner 13 is to protect the cargo compartment from scratches and rust but, if desired, it may be omitted. If the bed liner is omitted, then joints 90 may be rigidly affixed directly to side walls 16 and 17 of the truck's cargo compartment.

FIG. 2 shows telescopic arm member R securing removably a seat 8 to joints 90 on bed liner sections covering opposite side walls 16 and 17 of the cargo compartment of pickup truck 10. Said arm member R comprises a substantially cylindrical hollow tube or outer sleeve 20 and a solid striated inner shaft or rod 21 which is snugly but slidably received in sleeve 20. FIG. 2 also shows that seat 8 is retainable in such a way that a seat occupant faces the rear instead of the front of the truck when seated with backrest 33 in an upright position against his or her back. A main advantage of facing the rear of the truck is that when the vehicle is moving forward the very same sitting orientation and the backrest of the seat protect the seat occupant from the impact of the wind, rain, snow or dust.

In FIG. 3 a portion of sleeve 20 is shown passing through a securing loop 4 on the rear of the seat 8 with a rectangular cushioned end 40 of the sleeve 20 opposite to the end 44 which receives the shaft 21 snugly fitted inside joint 90 on a bed liner section covering side wall 16 of the cargo compartment. A rectangular cushioned end 50 of the striated shaft 21 opposite to the end 55 received in the sleeve 20 is also shown about to be fitted inside a respective joint 90 on a bed liner section covering the opposite side wall 17 of the cargo compartment. A pin 80 is also shown extending through coinciding holes on the sleeve 20 and the securing loop 4 on the rear of the seat. The purpose of the pin is to prevent the seat from sliding towards either side wall 16 or 17 of the cargo compartment. The pin is secured removably. Securing loop 4 is located under the backrest of the seat so that said backrest can be reclined backwards even when the seat is attached to outer sleeve 20 and to the cargo compartment of the pickup truck.

In FIG. 4 a key 24 is then shown releasably locking the shaft 21 to the sleeve 20 after the shaft has been slid outwardly to the point where joint 90 on the bed liner section covering side wall 17 does not allow the shaft to be extended out of the sleeve any further. Rectangular end 55 of the striated shaft is thus shown snugly fitted inside said joint 90.

Key 24 is rotatably adjustable within chamber 25 on sleeve 20. As the key is turned it extends outwardly a small pin 32 to obstruct the movement of the striated shaft 21 within sleeve 20 and thus lock the shaft after the shaft is slided to a position along the sleeve where joint 90 does not allow the shaft to slide outwardly any further. (See FIG. 4). Conversely, as the key is returned to its original position pin 32 retracts inside chamber 25 to allow the striated shaft 21 to retract again inside sleeve 20.

To detach seat 8 from joints 90 on the bed liner sections covering side walls 16 and 17 of the cargo compartment, shaft 21 would be retracted inside sleeve 20 after key 24 unlocks the shaft from the sleeve. Pin 80 extending through coinciding holes on securing loop 4 and sleeve 20 would also be unlocked and removed, to thus unlock also the sleeve from securing loop 4 and slidably remove the sleeve from said securing loop so that the seat can be used as any other ordinary seat, unconnected to the sleeve and the cargo compartment of the pickup truck.

I claim:

1. In combination with a truck with a cargo compartment having a bottom wall, front and back sides and opposite side walls extending up from said bottom wall at least one seat having a redlinable backrest structure pivoted to swing back and down, relative to a bottom of the seat, and at least one arm engageable with said seat, comprising:

securing means on said side walls with which to secure at least one said arm, which can be engaged to said opposite side walls; and whereby said backrest structure can be reclined backward and down when said arm is secured to said seat and said opposite side walls.

2. In combination with a truck with a cargo compartment having a bottom wall, front and back sides and opposite side walls extending up from said bottom wall, at least one seat having a reclinable backrest structure pivoted to swing back and down, relative to a bottom of the seat, which can be reclined back and down when said seat is secured within said compartment in an upstanding position, and means for securing said seat to said opposite side walls.

3. In combination with a truck with a cargo compartment having a bottom wall, front and back sides and opposite side walls extending up from said bottom wall, at least one seat having a reclinable backrest structure pivoted to swing back and down and at least one arm engageable with said seat, comprising:

securing means on said side walls with which to secure at least one said arm, which can be engaged to said opposite side walls; and whereby said backrest structure can be reclined backward and down as the rest of the seat remains unmoved, when said arm is secured to said seat and said opposite side walls.

4. In combination with a truck with a cargo compartment having a bottom wall, front and back sides and opposite side walls extending up from said bottom wall, at least one seat having a reclinable backrest structure pivoted to swing back and down relative to a bottom of the seat, and at least one arm engageable with said seat, comprising:

securing means on said side walls with which to secure at least one said arm, which can be engaged to said opposite side walls; and whereby said backrest structure can be reclined backward and down, when said arm is secured to said seat and said opposite side walls, so that even as said truck is driven a person occupying said seat can move his or her head and shoulders further back of his or her lower body and stretch out comfortably.

* * * * *